(12) United States Patent
Yuan et al.

(10) Patent No.: US 7,373,631 B1
(45) Date of Patent: May 13, 2008

(54) METHODS OF PRODUCING APPLICATION-SPECIFIC INTEGRATED CIRCUIT EQUIVALENTS OF PROGRAMMABLE LOGIC

(75) Inventors: Jinyong Yuan, Cupertino, CA (US); Gregg William Baeckler, San Jose, CA (US); James G Schleicher, II, Los Gatos, CA (US); Michael Hutton, Mountain View, CA (US)

(73) Assignee: Altera Corporation, San Jose, CA (US)

( * ) Notice: Subject to any disclaimer, the term of this patent is extended or adjusted under 35 U.S.C. 154(b) by 386 days.

(21) Appl. No.: 10/916,305

(22) Filed: Aug. 11, 2004

(51) Int. Cl.
*G06F 17/50* (2006.01)
*H03K 19/177* (2006.01)

(52) U.S. Cl. ............... 716/18; 716/4; 716/5; 716/7; 716/16; 326/38; 326/39; 326/41

(58) Field of Classification Search ............. 716/3, 716/4, 7, 9, 11, 16, 18; 326/38, 39, 41
See application file for complete search history.

(56) References Cited

U.S. PATENT DOCUMENTS

| | | | | |
|---|---|---|---|---|
| 5,526,278 A * | 6/1996 | Powell | | 716/16 |
| 6,080,204 A * | 6/2000 | Mendel | | 716/7 |
| 6,102,964 A * | 8/2000 | Tse et al. | | 716/18 |
| 6,215,327 B1 * | 4/2001 | Lyke | | 326/41 |
| 6,216,257 B1 * | 4/2001 | Agrawal et al. | | 716/16 |
| 6,223,326 B1 * | 4/2001 | Fields et al. | | 716/4 |
| 6,311,316 B1 * | 10/2001 | Huggins et al. | | 716/12 |
| 6,490,717 B1 * | 12/2002 | Pedersen et al. | | 716/18 |
| 6,643,829 B1 * | 11/2003 | Borkovic et al. | | 716/3 |
| 6,668,364 B2 * | 12/2003 | McElvain et al. | | 716/7 |
| 6,747,478 B2 * | 6/2004 | Madurawe | | 326/39 |
| 6,760,888 B2 * | 7/2004 | Wang et al. | | 716/1 |
| 6,823,497 B2 * | 11/2004 | Schubert et al. | | 716/4 |
| 6,904,576 B2 * | 6/2005 | Ng et al. | | 716/4 |
| 7,010,769 B2 * | 3/2006 | McElvain et al. | | 716/9 |
| 7,019,557 B2 * | 3/2006 | Madurawe | | 326/38 |
| 7,028,281 B1 * | 4/2006 | Agrawal et al. | | 716/12 |
| 7,080,344 B2 * | 7/2006 | Bajuk et al. | | 716/16 |

(Continued)

OTHER PUBLICATIONS

Speitel et al., "Acceleration of DAB chipset development of a real-time rapid prototyping approach based on behavioral synthesis"; Mar. 26-28, 2001, Quality Electronic Design, 2001 International Symposium on□□pp. 399-404.*

(Continued)

*Primary Examiner*—Jack Chiang
*Assistant Examiner*—Helen Rossoshek
(74) *Attorney, Agent, or Firm*—Ropes & Gray LLP; Robert R. Jackson

(57) ABSTRACT

Methods for facilitating the synthesis of structured ASICs that are functionally equivalent to FPGAs make use of the synthesis of a user's logic design for the FPGA. Each of several relatively small parts of the user's logic as synthesized for the FPGA technology is resynthesized for the structured ASIC implementation. The resynthesis may handle different kinds of parts of the logic differently. For example, for a part for which an ASIC synthesis is already known and available in a library, the known ASIC synthesis may be retrieved from the library. More extensive resynthesis (including, for example, logic minimization and function packing) may be performed on other parts of the logic for which library syntheses are not available.

17 Claims, 6 Drawing Sheets

U.S. PATENT DOCUMENTS

| | | | |
|---|---|---|---|
| 7,082,582 B1* | 7/2006 | Borkovic et al. | 716/3 |
| 7,089,517 B2* | 8/2006 | Yamoto et al. | 716/5 |
| 7,117,463 B2* | 10/2006 | Graham et al. | 716/5 |
| 7,120,883 B1* | 10/2006 | van Antwerpen et al. | 716/6 |
| 7,131,098 B2* | 10/2006 | Darringer et al. | 716/18 |
| 7,139,985 B2* | 11/2006 | Jones | 716/1 |
| 2004/0222817 A1* | 11/2004 | Madurawe | 326/39 |
| 2006/0200785 A1* | 9/2006 | Borkovic et al. | 716/6 |
| 2006/0259878 A1* | 11/2006 | Killian et al. | 716/1 |
| 2006/0259889 A1* | 11/2006 | Crosetto | 716/10 |
| 2007/0210827 A1* | 9/2007 | Chua et al. | 326/38 |

OTHER PUBLICATIONS

White et al., "FPGA design with Mentor and Altera CAD software", Apr. 13, 1994, Software Support and CAD Techniques for FPGAs, IEEE Colloquium on, pp. 1/1-1/5.*

Vahid et al., A comparison of functional and structural partitioning, Nov. 6-8, 1996, System Synthesis, 1996. Proceedings., 9th International Symposium on, pp. 121-126.*

Meerwein et al.; :Embedded systems verification with FPGA-enhanced in-circuit emulator; Sep. 20-22, 2000; System Synthesis, 2000. Proceedings. The 13th International Symposium on; pp. 143-148.*

Tessier et al.; "Incremental compilation for parallel logic verification systems"; Oct. 2002; Very Large Scale Integration (VLSI) Systems, IEEE Transactions on; vol. 10, Issue 5, pp. 623-636.*

Feske et al.; "FPGA based prototyping using a target driven FSM partitioning strategy"; , Sep. 7-10, 1998; Electronics, Circuits and Systems, 1998 IEEE International Conference on; vol. 1pp. 89-92 vol. 1.*

U.S. Appl. No. 10/884,460, filed Jul. 2, 2004, Chua et al.

* cited by examiner

METHODS OF PRODUCING APPLICATION-SPECIFIC INTEGRATED CIRCUIT EQUIVALENTS OF PROGRAMMABLE LOGIC

BACKGROUND OF THE INVENTION

This invention relates to methods for producing application-specific integrated circuit ("ASIC") equivalents of programmable logic devices such as field-programmable gate arrays ("FPGAs").

The ASICs referred to herein are structured ASICs in the sense that they have a basic organization, structure, or architecture that is predetermined or fixed. Only certain features of the ASIC are customizable to meet each user's particular design. For example, many of the device-fabrication masks that are needed to make the ASIC are always at least substantially the same. Only some of the masks in the set are customized to implement a particular user's design. Examples of features that are always at least substantially the same may include the masks that produce the operational elements of the ASIC. Examples of features that may be customized include certain aspects of the circuitry that interconnects various operational elements. Use of ASICs that are basically structured in this way, and that therefore require only some masks to be customized, greatly simplifies and speeds up the process of producing ASIC equivalents of FPGAs. This approach also has numerous other advantages such as lower cost, lower risk of error, etc.

Chua et al. U.S. patent application Ser. No. 10/884,460, filed Jul. 2, 2004, ("the Chua reference") discusses some examples of when it may be desirable to provide an ASIC equivalent of an FPGA. The Chua reference (which is hereby incorporated by reference in its entirety) shows ASIC architectures that are structured to facilitate providing FPGA equivalents. The Chua reference also shows methods for equivalently implementing a user's logic design in either an FPGA or a structured ASIC. Improvements, refinements, and enhancements in this general type of technology are always being sought, and the present invention provides various such improvements, refinements, and enhancements.

SUMMARY OF THE INVENTION

In accordance with certain aspects of the invention, a user's logic design is synthesized for implementation in a structured ASIC (which will be functionally equivalent to an FPGA implementing that logic design) by first synthesizing the logic design for implementation in the FPGA technology. Each of many relatively small parts of an FPGA technology mapping of the logic design is then resynthesized for implementation in the structured ASIC. Different kinds of these parts of the logic may be handled differently in this resynthesis. For example, a logic part for which an ASIC implementation already exists in a library may be resynthesized by retrieving the appropriate ASIC synthesis from the library. A logic part that is not a library part may be freshly resynthesized for ASIC implementation. For example, this resynthesis may include logic minimization and packing to reduce the amount of ASIC circuitry required for the ASIC implementation.

By working individually on relatively small parts of the user's logic as already synthesized for the FPGA technology, the invention helps to ensure substantial functional equivalence between FPGA and structured ASIC implementations of the logic. This approach also maintains correspondence between certain reference points ("anchor points") in both the FPGA and ASIC implementations of the logic. This can be another way of helping to ensure equivalence between the FPGA and ASIC implementations.

A possible feature of the invention is that it can try to resynthesize a part of the FPGA technology mapping of the logic that may be too large for an amount of ASIC logic of a predetermined maximum size. If a part is found to be too large for such an amount of ASIC logic, the part is divided into subparts until each subpart is implementable in that amount of ASIC logic (or less).

Further features of the invention, its nature and various advantages, will be more apparent from the accompanying drawings and the following detailed description of the preferred embodiments.

DETAILED DESCRIPTION

In the above-mentioned Chua reference it is generally assumed that the FPGA architecture being discussed has logic elements ("LEs") that are small enough to be implemented in relatively small numbers of hybrid logic elements ("HLEs") in a structured ASIC equivalent of the FPGA. The present invention allows this assumption to be somewhat relaxed. The present invention can use the same structured ASIC HLE that the Chua reference shows and describes, and indeed the illustrative embodiments shown and described herein assume use of that type of ASIC HLE. However, the present invention facilitates working with FPGA architectures that include such things as (1) FPGA LEs that are larger and/or more complex than the FPGA LEs generally assumed in the Chua reference and/or (2) blocks of FPGA logic or other circuitry for which good ASIC HLE equivalents are already known in advance. Thus the present invention may somewhat relax the Chua reference's general assumption of one-for-one correspondence between each FPGA LE look-up table ("LUT") or register and one or a small number of ASIC HLEs. Nevertheless, the present invention maintains correspondence between certain reference points ("anchor points") in equivalent FPGAs and ASICs. These anchor points may include, for example, LUT outputs and/or register outputs.

Figure 1:
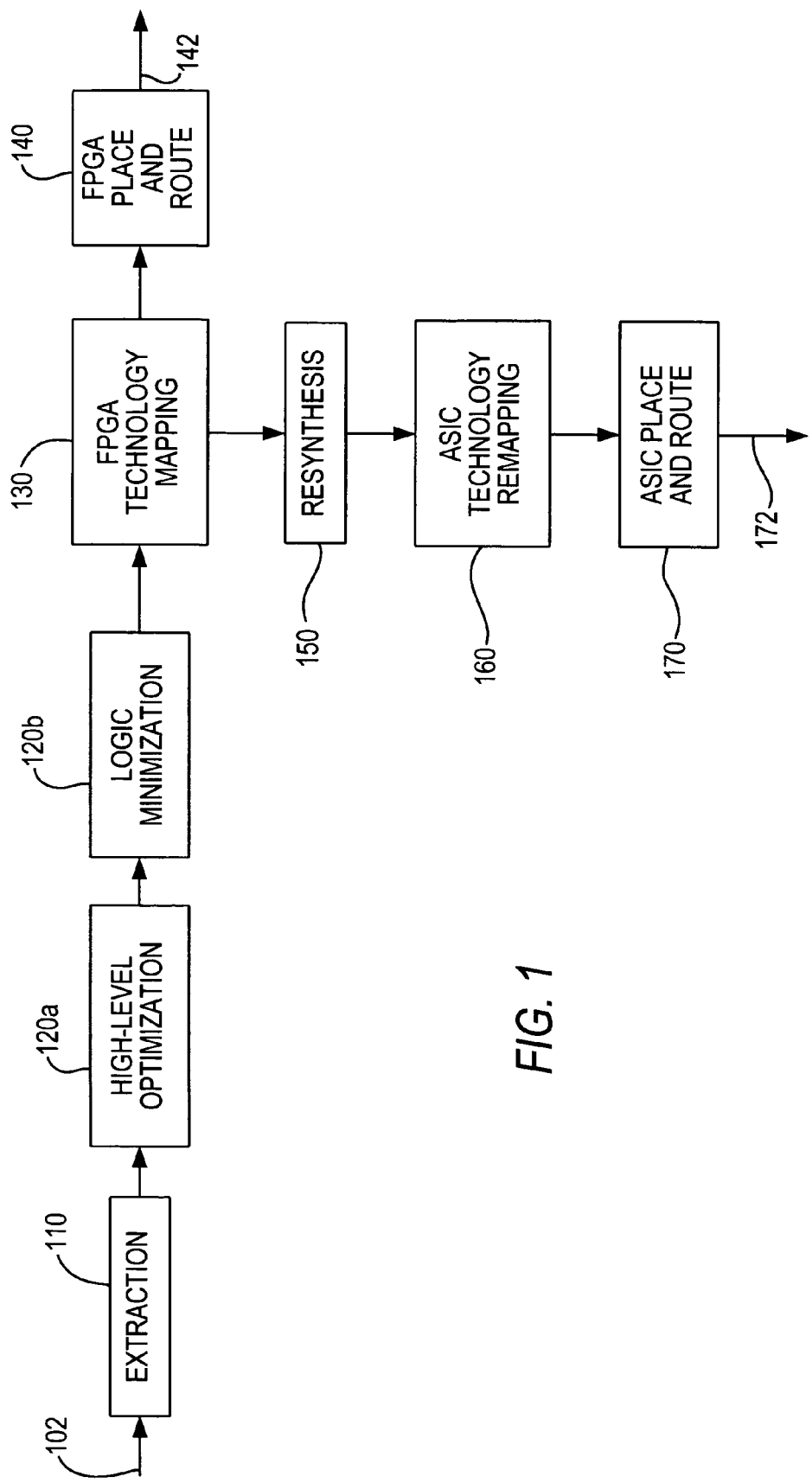
FIG. 1 is a simplified flow diagram of an illustrative embodiment of methods for producing structured ASIC equivalents of FPGAs in accordance with the invention.

An illustrative design flow that includes steps (in accordance with this invention) for producing an ASIC equivalent of a user's FPGA design is shown in FIG. 1. The steps in the horizontal row across the top of FIG. 1 can be conventional steps for implementing the user's logic design in a particular FPGA architecture or product. The steps below the top row are those of this invention for producing an equivalent of the user's FPGA design in a structured ASIC.

Because the flow across the top of FIG. 1 can be conventional, it can be described relatively briefly. Input 102 is a specification of logic a user wants to implement. This specification can be in any of several conventional forms such as Verilog, VHDL, or the like. Extraction step 110 takes the user's HDL source and translates it into a netlist that is a mixture of simple logic gates, registers, and operators like adders, multipliers, encoders, decoders, and multiplexers. High-level optimization step 120*a* takes this netlist and translates it into a netlist of only simple gates, registers, and some hard blocks like arithmetic chains, DSP blocks, and memory blocks. Logic minimization step 120*b* takes the netlist of simple gates, registers, and hard blocks, and tries to minimize the simple gates such that a netlist results which is better for FPGA technology mapping. FPGA technology mapping step 130 takes the minimized netlist of simple gates, registers, and hard blocks, and maps the simple gates to FPGA LUTs. Step 130 then translates this netlist into a netlist of logic cells (LUTs), I/Os, and hard blocks. FPGA place and route step 140 locates the mapping from step 130 on a particular FPGA product. The output 142 from step 140 can be used by assembler hardware and software to actually configure (program) an FPGA so that it will perform the functions required by the user.

It will be appreciated that at least some of the steps across the top of FIG. 1 preferably take into account at least the general type of FPGA that is going to be used. For example, some FPGAs use four-input LUTs ("4-LUTs") as basic logic building blocks, while other FPGAs use six-input LUTs ("6-LUTs") as basic logic building blocks. A step like step 120*b* may benefit from knowing whether the target FPGA includes 4-LUTs or 6-LUTs because logic may be minimized differently depending on the size of the LUTs. Similarly, step 130 generally must know the size of the LUTs in the target FPGA in order to map the simple logic gates from step 120*b* to the LUTs.

As has been mentioned, steps 150-170 in accordance with this invention are employed to produce a structured ASIC equivalent of the FPGA that results from using output 142 as described above. The basic architecture of such an ASIC can be an array of HLEs as shown in the Chua reference mentioned above. Thus FIGS. 3 and 15 from the Chua reference are repeated herein as FIGS. 2 and 3, respectively. Additional description of what is shown in these FIGS. will be found in the Chua reference. So that the present specification will be complete by itself if additional description is not wanted, the following brief descriptions of the various elements in these FIGS. is provided.

Figure 2:
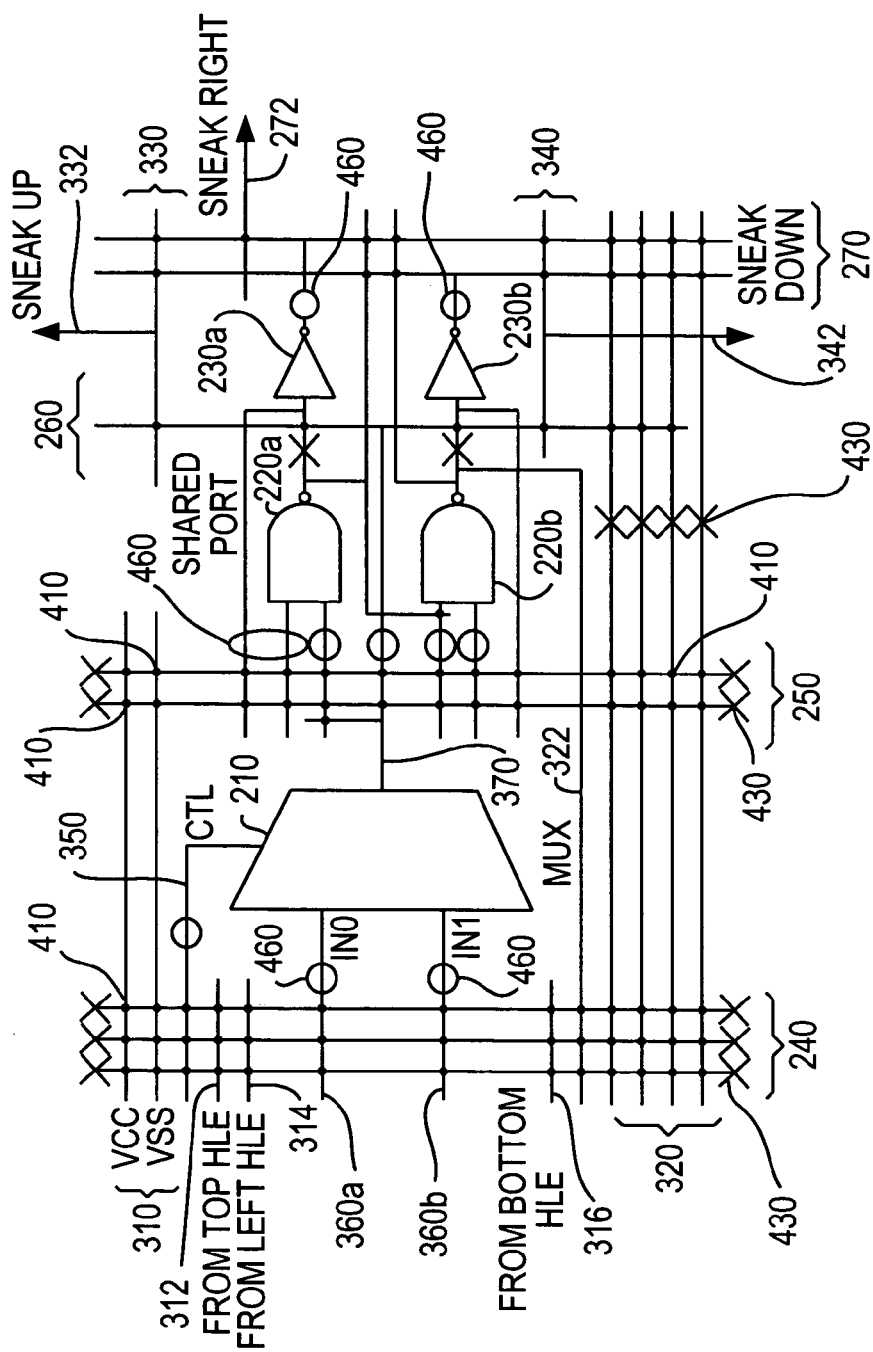
FIG. 2 is a simplified schematic block diagram of an illustrative embodiment of structured ASIC circuitry that can be used in accordance with the invention.

| FIG. 2 Element (Letter Suffixes of Reference Numbers Omitted) | Description |
| --- | --- |
| 200 | Hybrid logic element ("HLE"). |
| 210 | Two-input multiplexer. |
| 220 | Two-input NAND gates. |
| 230 | Inverting buffers or drivers. |
| 240 | Vertical conductors. |
| 250 | Vertical conductors. |
| 260 | Vertical conductors. |
| 270 | Vertical conductors. |
| 272 | Source of input 314 to the HLE to the right of depicted HLE. |
| 310 | Horizontal conductors. |
| 312 | "Sneak" connection from another adjacent HLE above depicted HLE. |
| 314 | "Sneak" connection from another adjacent HLE to the left of depicted HLE. |
| 316 | "Sneak" connection from another adjacent HLE below depicted HLE. |
| 320 | Horizontal conductors. |
| 322 | Feedback conductor within HLE. |
| 330 | Horizontal conductors. |
| 332 | Source of input 316 to the HLE above depicted HLE. |
| 340 | Horizontal conductors. |
| 342 | Source of input 312 to the HLE below depicted HLE. |
| 350 | Conductor. |
| 360 | Conductors. |
| 370 | Conductor. |
| 410 | Locations (indicated by small solid dots) at which connections between the intersecting conductors can be made or not made as desired (e.g., using mask-programmed vias). |
| 430 | Locations (indicated by Xs) at which conductor segments can be programmably connected to one another or not as desired (e.g., using mask-programmable vias). |
| 460 | Locations (indicated by large open circles or ovals) at which the conductors having those circles or ovals can be programmably connected to a higher level of interconnection resources on the device (e.g., using mask-programmable vias). |

Figure 3:
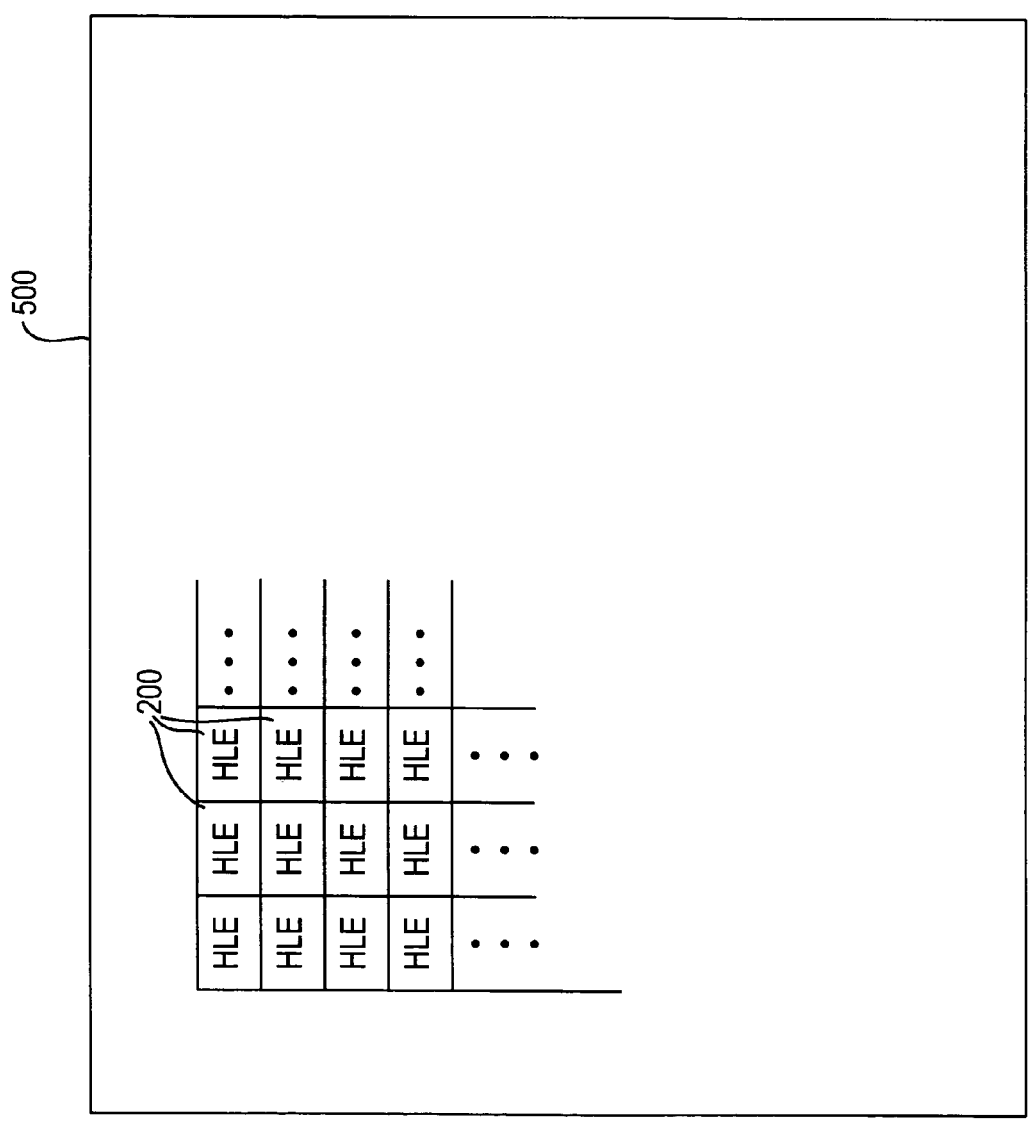
FIG. 3 is a simplified block diagram of illustrative structured ASIC circuitry that can be used in accordance with the invention.

| FIG. 3 Element | Description |
| --- | --- |
| 200 | HLE |
| 500 | ASIC |

As in the Chua reference, the particular structures shown in FIGS. 2 and 3 are only examples, and many variations are possible.

Returning to FIG. 1, the overall objective of steps and/or results ("flow elements") 150-170 is to produce a design for an ASIC 500 (including an array of HLEs 200) that is functionally equivalent to an FPGA that results from using output 142. To do this, flow elements 150-170 do not completely resynthesize the user's logic design from the beginning 102. This is not done because such a completely resynthesized design might not be as close to an equivalent to an FPGA from output 142 as is desired. For example, there might be a greater risk of errors in such a completely resynthesized design. Greater timing differences might also result from such an approach. Moreover, such deviations from true FPGA-to-ASIC equivalence might not be discovered or discoverable until after the relatively expensive ASIC fabrication process had been completed and the resulting ASICs tested.

To avoid these possible problems of complete resynthesis of the user's design from the beginning 102, the flow elements 150-170 of this invention start from the results of FPGA technology mapping step 130 in the FPGA logic synthesis of the user's design. In particular, flow elements 150-170 operate on individual parts of the results of technology mapping step 130. This will be explained in more detail later, but preliminarily what this means is that in flow elements 150-170 each of these parts is resynthesized for HLE implementation separately. Each such resynthesis is thus a relatively small task, with little or no risk of introducing any FPGA non-equivalence into the result. Moreover, certain key points ("reference points" or "anchor points") in the FPGA implementation (e.g., LUT outputs, register outputs, etc.) are directly preserved in the HLE implementation and can be used to help verify the equivalence of the FPGA and ASIC implementations. The preservation of such anchor points is made possible by dividing the FPGA technology mapping 130 results into parts (for individual resynthesis as described herein) such that the desired anchor points are at (or on) the boundaries of (or between) the parts.

An overview of flow elements 150-170 will be provided next. More details will be provided later.

As mentioned above, resynthesis step 150 operates on individual, relatively small parts of the results of FPGA mapping step 130 to resynthesize each such part for implementation using HLEs 200. A LUT performing a combinational logic function is an example of a part of FPGA mapping step 130 that step 150 may operate on individually. In this example, step 150 resynthesizes that LUT as one or more HLEs 200 that can equivalently perform the combinational logic function of the LUT. In this example, step 150 may perform an unrestricted or unlimited (or at least relatively unrestricted or unlimited) resynthesis of the LUT to produce an optimal or near-optimal HLE implementation (e.g., an implementation using a minimum or near-minimum number of HLES).

Other types of parts in the results of FPGA mapping step 130 may be handled differently in resynthesis step 150. For example, some kinds of parts may have desired HLE implementations that are known in advance. A flip-flop may be an example of such a part. Other examples may include adders, two-to-one multiplexers (implementable in a single HLE), and other "hard" functional blocks. Parts of this kind may be handled in resynthesis step 150 by retrieving their HLE implementations from a library (computer memory) of such implementations. For example, certain types of flip-flops can be implemented by two HLEs (see again the above-mentioned Chua reference), and these implementations can be looked up in and retrieved from a library of predetermined HLE implementations as part of the performance of resynthesis step 150.

When resynthesis step 150 is finished, the resulting netlist includes LUTs that can be implemented in individual HLEs or relatively small clusters of HLEs ("CHLEs"), and library elements such as adders, flip-flops, two-to-one multiplexers, and other hard-blocks. This whole netlist (including the internal connections of the HLEs and CHLEs) is prepared for ASIC place and route step 170 by ASIC technology remapping step 160. ASIC place and route step 170 is like FPGA place and route step 140, except that it is for an HLE-basic ASIC rather than for an LE-based FPGA. The output 172 from step 170 can be used by assembler hardware and software to customize the customizable masks for an HLE-based ASIC so that when the ASIC is manufactured using those masks (and other standard masks), the ASIC will perform substantially equivalently to an FPGA programmed using output 142.

Figure 4A:
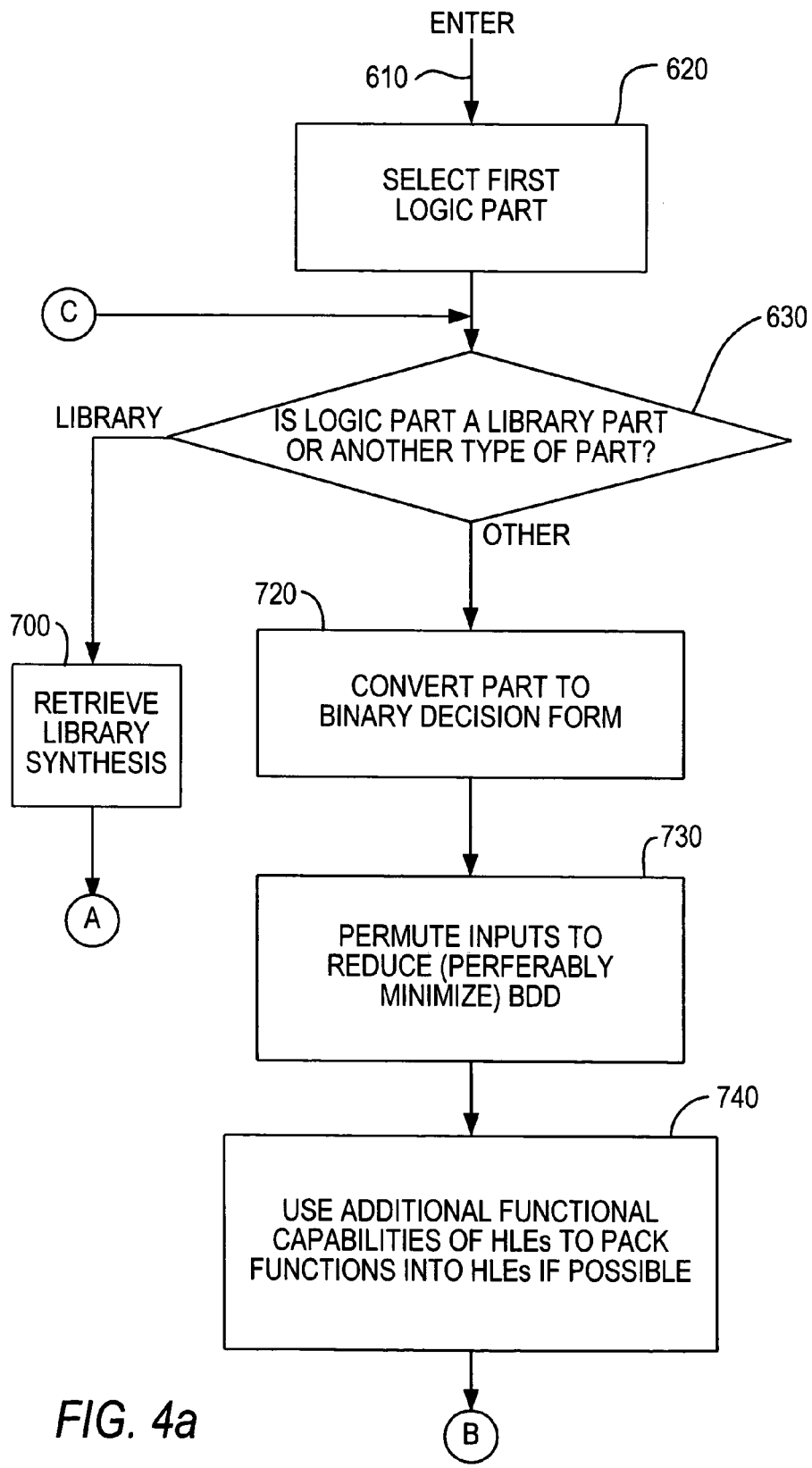
FIGS. 4a and 4b are collectively a simplified flow diagram showing an illustrative embodiment of a portion of FIG. 1 in more detail in accordance with the invention.
Figure 4B:
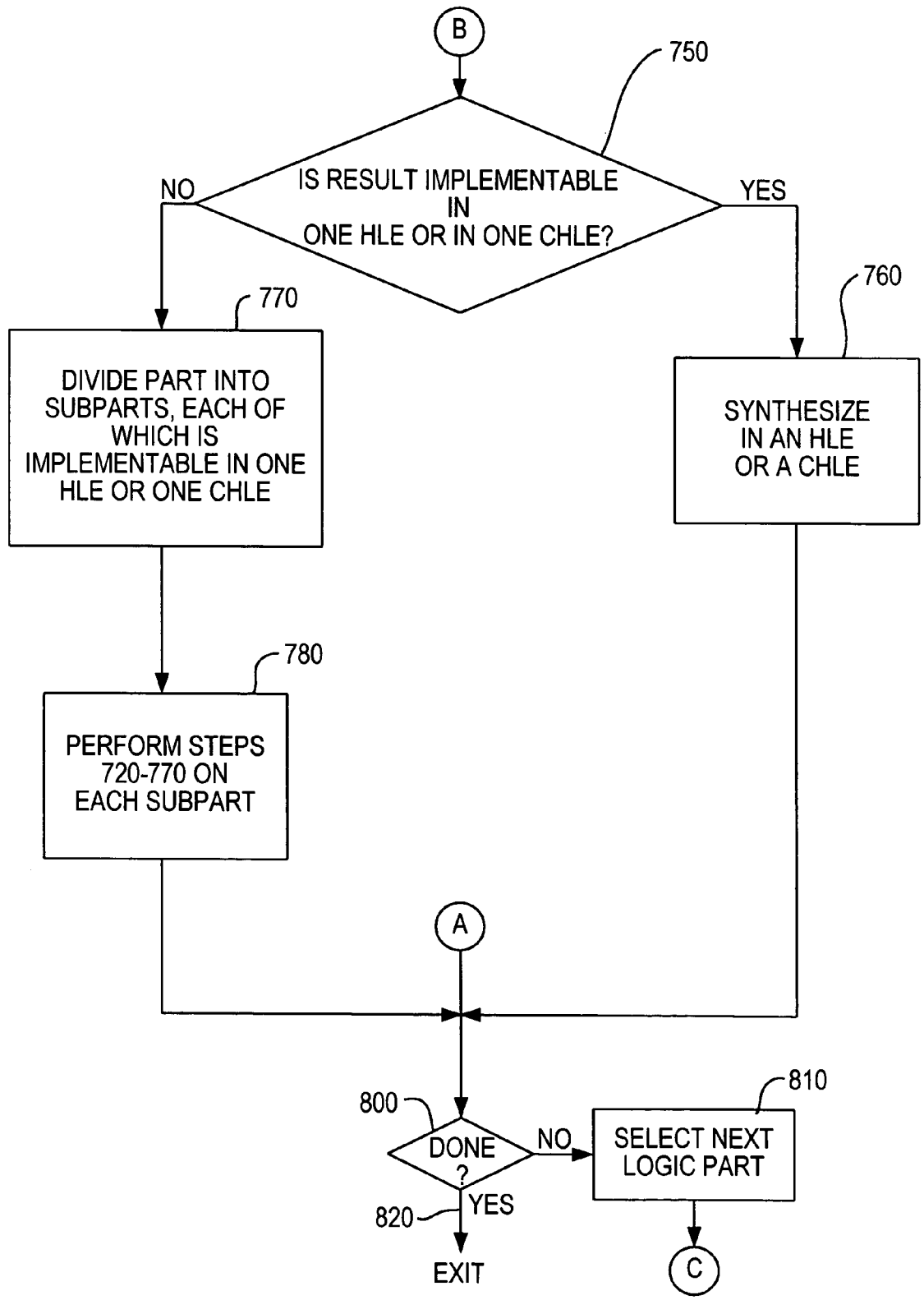

An illustrative embodiment of resynthesis step 150 (and possibly also including some aspects of ASIC technology remapping step 160) is shown in more detail in FIGS. 4a and 4b (collectively "FIG. 4"). The flow in FIG. 4 is entered at 610 (from flow element 130 in FIG. 1). In step 620 a first part of the FPGA mapping (from flow element 130) is selected for ASIC resynthesis. Such a "part" of the FPGA mapping may be, for example, a LUT in that mapping.

In step 630 the part of the FPGA logic selected is considered to determine whether it is a library part or another type of part. If step 630 determines that the part being worked on is a library part, control passes from step 630 to step 700.

As mentioned earlier in this specification, a library part is a part for which an optimum, near optimum, or at least desired HLE implementation has been worked out in advance and stored in a library (memory) of such implementations for future retrieval. Examples of library parts may include adders, flip-flops, two-to-one multiplexers, and other hard-blocks. In step 700 the predetermined library synthesis of the particular library part that is being worked on is retrieved from the library of such syntheses. Control then passes to step 800.

Returning to step 630, if the part being worked on is not a library part, control passes from step 630 to step 720.

Figure 5:
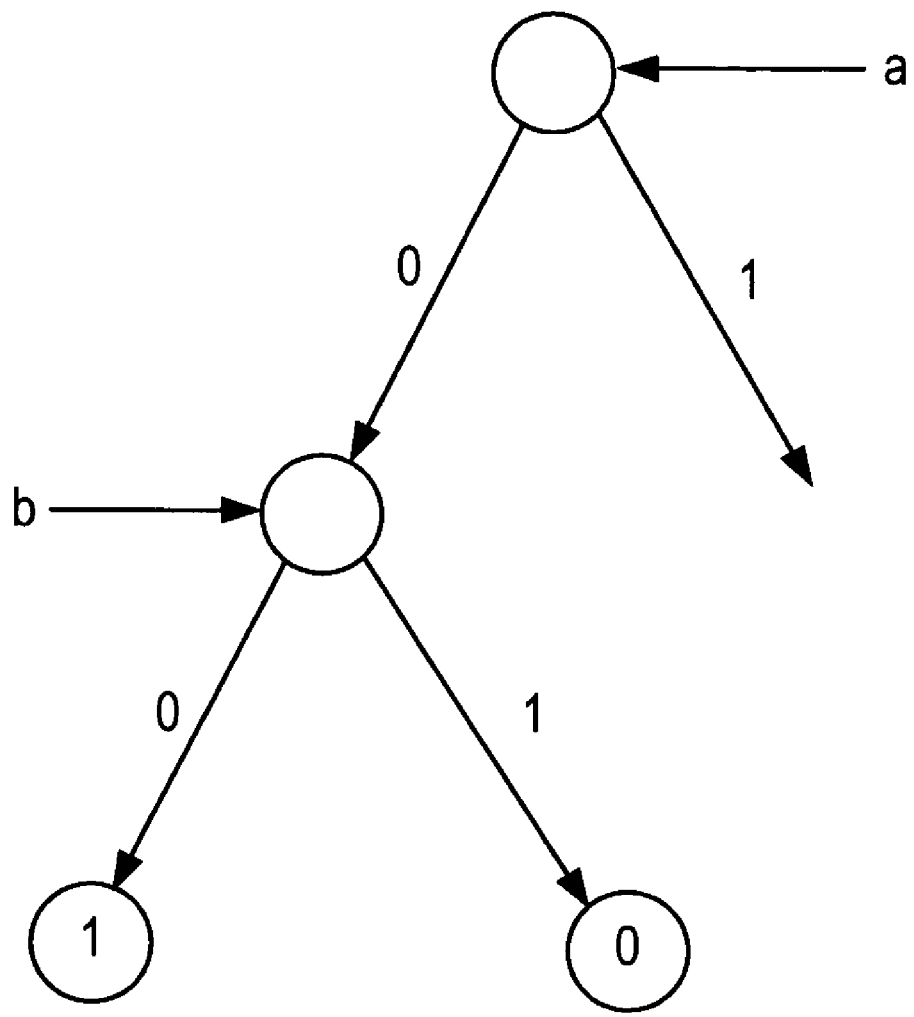
FIG. 5 is an illustrative binary decision tree or diagram that is useful in explaining certain aspects of the invention.

In step 720 the part is converted to binary decision tree form. FIG. 5 shows (in part) an example of a very simple binary decision tree or binary decision diagram ("BDD"). The selection control inputs to this BDD are "a", "b", etc. The route taken out of each node is dependent on the value of the selection control input to that node (as indicated by the "1" or "0" on each output route). The value of the ultimate output is shown in the circles at the bottom of the diagram. In the example shown in FIG. 5, the ultimate output is 1 if selection control inputs $\underline{a}$ and $\underline{b}$ are both 0, and the ultimate output is 0 if $\underline{a}$ is 0 and $\underline{b}$ is 1. Each node in a BDD corresponds to one HLE 200 (FIG. 2). It is therefore possible to minimize (or at least reduce) the number of HLEs required to implement a BDD by minimizing (or at least reducing) the size of the BDD. The order of the inputs ($\underline{a}$, $\underline{b}$, etc.) to a BDD can greatly affect the size of a BDD. Because we are dealing with logic parts that are relatively small (e.g., LUTs having no more than six inputs ("6-LUTs")), it is reasonably possible to exhaustively try all orders of the inputs to a part to find the smallest tree (BDD). But even if such exhaustive permutation of the inputs to the BDD is not desired, at least some permutation of the inputs is likely to produce some reduction in the size of the BDD. Accordingly, in step 730 at least some permutation of the BDD inputs is performed so that at least some reduction in the size of the BDD is typically achieved. If desired, step 730 can be allowed to proceed until all possible permutations of the BDD inputs have been tried, which should allow the BDD of minimum size to be found and selected.

Once the BDD has been minimized (or at least somewhat reduced) in step 730, step 740 is performed to try to pack the function of at least one HLE into the additional circuit capability of another HLE, and thereby still further reduce the number of HLEs required to implement the part. For example, each HLE may include two NAND gates 220a and 220b as shown in FIG. 2. If a downstream HLE in the step 730 BDD is performing a NAND operation, it may be possible to pack that function into an upstream HLE and thereby eliminate the downstream HLE. In this way the number of HLEs required to implement the part of the logic being worked on may be still further reduced. (Use of step

740 assumes that, for the part being worked on, step 730 indicates a requirement for at least two HLEs.)

In step 750 the results of step 740 are examined to determine whether the part is implementable in one HLE or in one CHLE (including no more than a predetermined maximum number of HLEs). For example, it may be specified that a CHLE can include no more than about six preferably adjacent or nearby HLEs. If step 750 determines that the part being worked on can be implemented in one HLE or in one CHLE, control passes to step 760, in which the part is synthesized in one HLE or in one CHLE as required. Control then passes to step 800. If step 750 determines that the result of step 740 is not implementable in one HLE or in one CHLE, then control passes from step 750 to step 770.

In step 770 the part being worked on (from step 630) is divided into subparts, each of which is implementable in one HLE or in one CHLE. For example, if the part being worked on is a fully or nearly fully utilized 6-LUT, step 770 may divide that 6-LUT into several 5-LUTs (five-input look-up tables) and some additional multiplexer circuitry. (Still further subdivision may be necessary to achieve the ultimate end of being able to implement each subpart in one HLE or in one CHLE. Such possible further subdivision is implied by the inclusion of more possible performances of step 770 in following step 780. For example, in the case of dividing a 6-LUT into 5-LUTs, etc., one or more of the 5-LUTs may still be too large and may need further subdivision into 4-LUTs (four-input look-up tables), etc.) From step 770 control passes to step 780.

In step 780 each subpart from step 770 is processed in accordance with steps 720-770, as is appropriate for that subpart. When all subparts (or further subparts of each subpart) have been successfully synthesized as in step 760, control passes from step 780 to step 800.

Step 800 tests whether all parts of the logic (from step 130 in FIG. 1) have been resynthesized for HLE-based ASIC implementation. If not, control passes to step 810, in which another part of the logic is selected for such resynthesis, and then control passes back to step 630. When all parts of the logic have been resynthesized, step 800 causes the FIG. 4 flow to be exited as shown at 820.

It will be understood that the foregoing is only illustrative of the principles of the invention, and that various modifications can be made by those skilled in the art without departing from the scope and spirit of the invention. For example, the maximum number of HLEs that can be included in a CHLE can be more or less than the number given as an example earlier in this specification.

What is claimed is:

1. A method of synthesizing a logic design for a structured ASIC implementation that is substantially functionally equivalent to an FPGA implementation of that logic design, the structured ASIC having an architecture that includes a plurality of hybrid logic elements, and the FPGA having an architecture that includes a plurality of look-up tables, each of the look-up tables having more logic capacity than each of the hybrid logic elements, the method comprising:
   producing a synthesis of the logic design that is usable to produce the FPGA implementation;
   dividing the synthesis into a plurality of parts, each of which is implementable in one of the look-up tables; and
   resynthesizing each of the parts for the structured ASIC implementation, wherein at least one of the parts requires more than a predetermined number of the hybrid logic elements, and wherein the resynthesizing of the at least one part comprises:
   subdividing the at least one part into a plurality of subparts; and
   resynthesizing each of the subparts for the structured ASIC implementation using no more than the predetermined number of the hybrid logic elements for each of the subparts.

2. The method defined in claim 1 wherein at least one of the parts is a part for which a resynthesis for the structured ASIC implementation has been previously stored in a library, and wherein for that part the resynthesizing comprises:
   retrieving the resynthesis of that part from the library.

3. The method defined in claim 1 wherein, for at least one of the parts, the resynthesizing comprises:
   forming a binary decision tree of the part.

4. The method defined in claim 3 wherein, after the forming, the resynthesizing further comprises:
   permuting inputs to the binary decision tree to attempt to reduce size of the binary decision tree.

5. The method defined in claim 4 wherein the permuting comprises:
   trying all possible permutations of the inputs.

6. The method defined in claim 4 wherein the permuting comprises:
   selecting the binary decision tree of minimum size found in the permuting.

7. The method defined in claim 4 wherein, each of the hybrids logic elements can implement at least one node of any binary decision tree, and wherein, after the permuting, the resynthesizing further comprises:
   packing a function of one of the hybrid logic elements implementing a node of the binary decision tree into a hybrid logic element implementing another node of the binary decision tree.

8. The method defined in claim 7 wherein a result of the packing is a trial resynthesis of the part being resynthesized, and wherein, after the packing, the resynthesizing further comprises:
   determining whether or not the trial resynthesis requires more than the predetermined number of the hybrid logic elements.

9. The method defined in claim 8 wherein the subdividing is performed for any part for which the determining determines that the trial synthesis requires more than the predetermined number of the hybrid logic elements.

10. A method of converting an FPGA synthesis of a logic design to a structured ASIC synthesis of that logic design, the structured ASIC having an architecture that includes a plurality of hybrid logic elements, and the FPGA having an architecture that includes a plurality of look-up tables, each of the look-up tables having more logic capacity than each of the hybrid logic elements, the method comprising:
   dividing the FPGA synthesis into a plurality of parts, each of which can be implemented in one of the look-up tables, and which parts include (1) at least one first part for which resynthesis for structured ASIC implementation is predetermined in a library, and (2) at least one second part for which resynthesis for structured ASIC implementation is not predetermined;
   resynthesizing the first part for structured ASIC implementation by retrieving the predetermined resynthesis from the library; and
   resynthesizing the second part for structured ASIC implementation by forming a binary decision tree of the second part and permuting inputs to the binary decision tree to attempt to reduce size of the binary decision tree so that the structured ASIC implementation of the second part does not require more than a predetermined number of the hybrid logic elements.

11. The method defined in claim 10 wherein the permuting comprises:
   trying all possible permutations of the inputs.

12. The method defined in claim 11 wherein the permuting further comprises:
   selecting the binary decision tree of minimum size found in the trying.

13. The method defined in claim 10 wherein a result of the permuting is a trial resynthesis of the second part, and wherein after the permuting the resynthesizing the second part comprises:
   determining whether or not the trial resynthesis requires more than the predetermined number of the hybrid logic elements.

14. The method defined in claim 13 wherein if the determining determines that the trial resynthesis requires more than the predetermined number of the hybrid logic elements, then the resynthesizing the second part comprises:
   subdividing the second part further into a plurality of subparts; and
   resynthesizing each of the subparts for structured ASIC implementation so that the structured ASIC implementation of each of the subparts does not require more than the predetermined number of the hybrid logic elements.

15. The method defined in claim 14 wherein the resynthesizing each of the subparts comprises:
   forming a binary decision tree of the subpart; and
   permuting inputs to the binary decision tree to attempt to reduce size of the binary decision tree.

16. A method of converting an FPGA synthesis of a logic design to a structured ASIC synthesis of that logic design, the structured ASIC having an architecture that includes a plurality of hybrid logic elements, and the FPGA having an architecture that includes a plurality of look-up tables, each of the look-up tables having more logic capacity than each of the hybrid logic elements, the method comprising:
   dividing the FPGA synthesis into a plurality of parts, each of which can be implemented in one of the look-up tables, and;
   determining whether a part can be resynthesized for structured ASIC implementation in no more than a predetermined number of the hybrid logic elements;
   if a result of the determining is affirmative, then resynthesizing the part for structured ASIC implementation; and
   if the result of the determining is negative, then subdividing the part into a plurality of subparts and resynthesizing each subpart for structured ASIC implementation using no more than the predetermined number of the hybrid logic elements for each of the subparts.

17. The method defined in claim 16 wherein the determining comprises:
   forming a binary decision tree of the part;
   permuting inputs to the binary decision tree to attempt to reduce size of the binary decision tree to a minimum; and
   determining whether the minimum can be implemented in no more than the predetermined number of the hybrid logic elements.

* * * * *